United States Patent Office 3,420,064
Patented Jan. 7, 1969

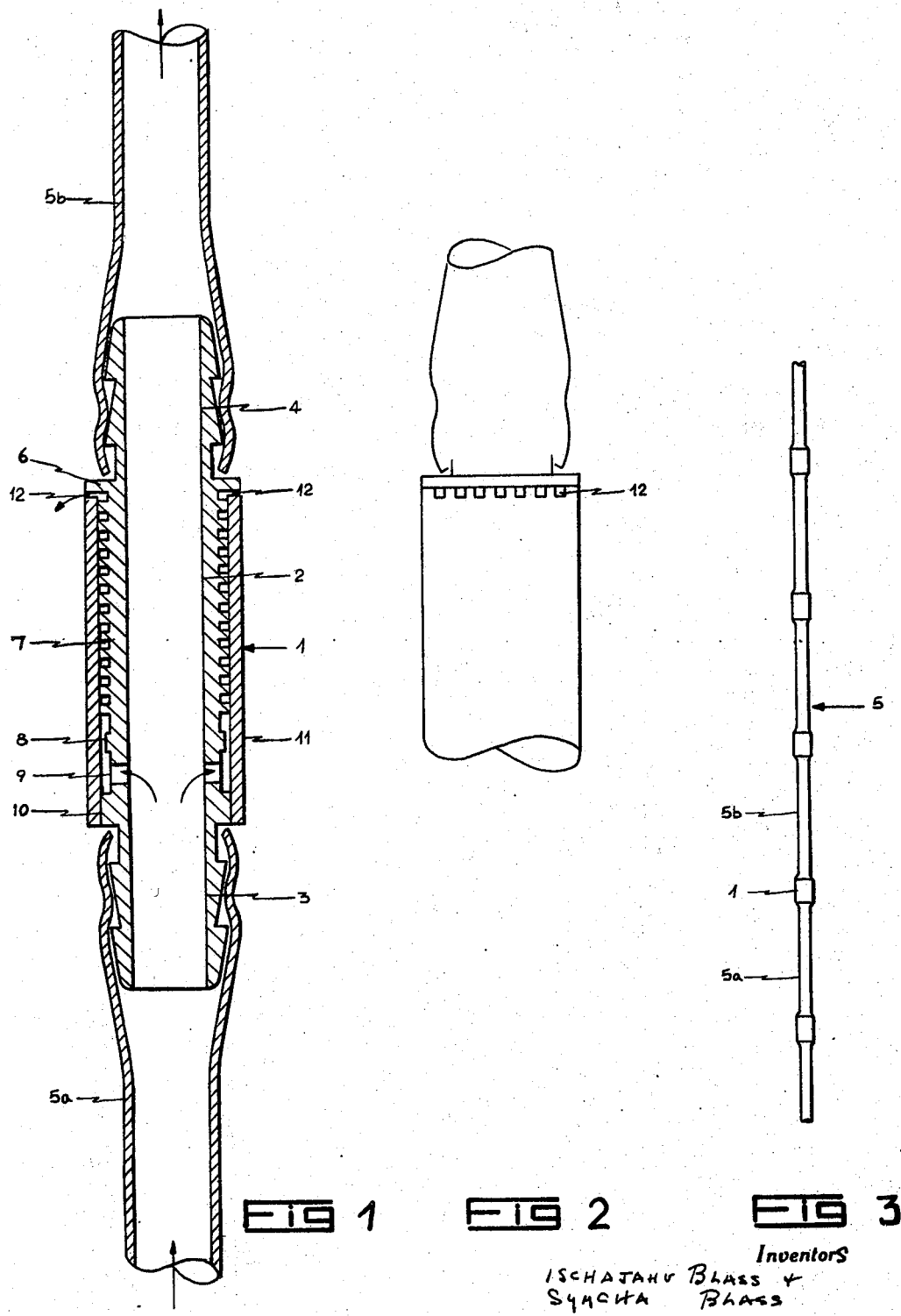

---

3,420,064
IRRIGATION DRIPPER UNIT AND PIPE SYSTEM
Ischajahu Blass and Symcha Blass, both of 26 Rehov
Manneh, Tel Aviv, Israel
Filed Dec. 22, 1966, Ser. No. 603,980
Claims priority, application Israel, Feb. 17, 1966,
25,197
U.S. Cl. 61—13        6 Claims
Int. Cl. E02b 13/00

ABSTRACT OF THE DISCLOSURE

This invention relates to an irrigation dripper unit for use in irrigation in association with an irrigation supply pipe and more particularly relates to a dripper unit which may be connected in series with the supply pipe and which has means to tap off a portion of the water flowing through the unit and to discharge such portion at a low drip rate.

---

It is an object of the present invention to provide a new and improved form of irrigation dripper unit.

According to the present invention there is provided an irrigation dripper unit comprising an outer tubular member, an inner tubular member fitting tightly within the outer tubular member, end portions of one of the tubular members adapted to connect together irrigation supply pipe portions, a continuous conduit defined by the walls of a continuous groove formed in the surface of one of the tubular members and the contiguous surface of the other tubular member, at least one inlet port formed in said inner tubular member adjacent to and communicating with one end of said conduit, at least one outlet port formed in said unit adjacent to and communicating with the opposite end of said conduit.

One embodiment of an irrigation dripper unit in accordance with the present invention will now be described by way of example and with reference to the accompanying drawings in which:

FIG. 1 is a longitudinal sectional elevation of the unit shown connected to two opposite ends of irrigation supply pipe portions, FIG. 2 is a plan view, on an enlarged scale, of a detail of the unit shown in FIG. 1, and FIG. 3 is a side elevation of an irrigation supply pipe including irrigation dripper units as shown in FIG. 1.

As seen in FIG. 1 of the drawings, the irrigation dripper unit 1 comprises an inner tubular member 2 having a pair of serrated end connecting portions 3 and 4 adapted for insertion into opposite ends of a pair of flexible irrigation supply pipe portions 5a and 5b. The inner tubular member 2 is formed with a peripheral abutment rib 6 which separates a central helically threaded portion 7 of the inner tubular member 2 from the end connecting portion 4. Formed adjacent the left-hand end of the threaded portion 7 is a peripheral ridge 8 of lesser height than the threading. A set of inlet ports 9 are formed in a central tubular member directly adjacent the peripheral ridge 8, whilst separating these inlet ports 9 from the end connecting portions 3 is a further peripheral ridge 10 substantially equal in height to the threading.

An outer tubular member 11 fits tightly over the inner tubular member 2 and surrounds the central threaded portion 7 thereof so that the threading makes firm contact with the inner wall of the outer tubular member thereby defining a tubular conduit.

The outer tubular member 11 is pushed over the inner tubular member 2 whilst these are still hot and flexible after moulding, the right-hand end of the outer tubular member 11 being adapted to abut against the peripheral abutment rib 6 and being formed at its right-hand edge with a plurality of slots 12, (seen clearly in FIG. 2 of the drawings) or incisions so as to define together with said rib 6 a plurality of outlet ports.

As can be seen clearly from FIG. 3 of the drawings there can thus be formed an irrigation supply pipe 5 consisting of successive portions 5a and 5b connected by units 1. The units 1 therefore constitute an integral part of the supply pipe 5 and the main flow of water passes from unit 1 to unit 1.

In use therefore water flowing through the supply pipe 5 enters the inner tube 2 and whilst most of the water passes through this tube 2 to the succeeding tubes 2 of succeeding units 1 a small quantity of the water flows out of each unit via the inlet ports 9 and through the helical conduit defined by the helical threaded portion 7 of the inner tube 2 and the inner wall of the outer tube 11.

By virtue of the fact that the ridge 8 does not reach the opposite wall of the outer tube 11 but is narrowly spaced therefrom, grit, etc., which may be present in the supply water and which would otherwise block the fine helical conduit is prevented from passing over this ridge 8 which therefore serves as a filter. The water which emerges from the helical conduit percolates out through the outlet ports constituted by the slots 12. It will be readily understood that whilst in the example shown above these outlet ports are defined between the abutment rib 6 of the inner tubular portion 2 and the edge of the outer tubular portion 11 these outlet ports could equally well be formed in the wall of the outer tubular portion itself.

Furthermore, it will be realised that the helical groove could equally well be formed on the inner surface of the outer tubular member whilst the end portions of the latter can be adapted for connection to the irrigation supply pipe portions.

We claim:
1. An irrigation dripper unit to connect adjacent pipe line sections, comprising an outer tubular member, an inner tubular member fitting tightly within the outer tubular member, opposite end portions of one of the tubular members projecting beyond the ends of the other tubular member for connection to adjacent supply pipe sections, a continuous elongated helical groove formed in the surface of one of the tubular members and defining a continuous conduit with respect to the contiguous surface of the other tubular member, at least one port defining an inlet, formed in said inner tubular member adjacent to and communicating with one end of said continuous conduit, the portions of said tubular members adjacent said port sealing said one end of the conduit from communication with the exterior of said unit, and at least one port defining an outlet in communication with the exterior of said unit, said port being formed in said unit adjacent to and communicating with the opposite end of said conduit.

2. An irrigation dripper unit according to claim 1, wherein said outlet port is defined between relatively spaced apart portions respectively integral with said tubular members.

3. An irrigation dripper unit according to claim 1, wherein one of said tubular members is provided with a continuous encircling rib located between said inlet port and said one end of the conduit, the edge of said rib being spaced from the opposite surface of the other tubular member.

4. An irrigation dripper unit according to claim 1, wherein said groove is formed on the outer surface of the inner tubular member.

5. An irrigation supply pipe system comprising a plurality of successive supply pipe portions connected together by the inner tubular member of the irrigation dripper units according to claim 1.

6. An irrigation dripper unit to connect adjacent pipe line sections, comprising an outer tubular member, an inner tubular member fitting tightly within the outer tubular member, opposite end portions of the inner tubular member projecting beyond the corresponding end portions of the outer tubular member for connection to adjacent pipe line sections, a continuous elongated helical groove formed in the surface of one of the tubular members and defining a continuous conduit with respect to the continuous surface of the other tubular member, at least one port defining an inlet formed in said inner tubular member adjacent to and communicating with one end of said contiguous conduit, the portions of said tubular members adjacent said port sealing said one end of the conduit from communication with the exterior of said unit, at least one port defining an outlet formed in said unit adjacent to and communicating with the opposite end of said conduit, said inner tubular member having a continuous encircling rib, said outlet port being defined between said encircling rib and the adjacent edge of the outer tubular member, said adjacent edge being spaced from said encircling rib.

References Cited

UNITED STATES PATENTS

| | | | |
|---|---|---|---|
| 146,572 | 1/1874 | Clark | 61—13 |
| 379,392 | 3/1888 | Haines | 61—12 |
| 2,981,072 | 4/1961 | Brewington | 61—13 X |

FOREIGN PATENTS

| | | |
|---|---|---|
| 505,608 | 5/1939 | Great Britain. |

EARL J. WITMER, *Primary Examiner.*